(12) United States Patent
Takeda et al.

(10) Patent No.: US 10,833,820 B2
(45) Date of Patent: Nov. 10, 2020

(54) USER TERMINAL AND RADIO BASE STATION

(71) Applicant: NTT DOCOMO, INC., Tokyo (JP)

(72) Inventors: Kazuki Takeda, Tokyo (JP); Satoshi Nagata, Tokyo (JP); Lihui Wang, Beijing (CN); Liu Liu, Beijing (CN); Huiling Jiang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/572,817

(22) PCT Filed: May 13, 2016

(86) PCT No.: PCT/JP2016/064242
§ 371 (c)(1),
(2) Date: Nov. 9, 2017

(87) PCT Pub. No.: WO2016/182048
PCT Pub. Date: Nov. 17, 2016

(65) Prior Publication Data
US 2018/0139020 A1    May 17, 2018

(30) Foreign Application Priority Data
May 14, 2015 (JP) ................................. 2015-099491

(51) Int. Cl.
*H04L 5/00* (2006.01)
*H04W 72/12* (2009.01)
*H04W 72/04* (2009.01)

(52) U.S. Cl.
CPC .......... *H04L 5/0037* (2013.01); *H04L 5/0053* (2013.01); *H04W 72/04* (2013.01);
(Continued)

(58) Field of Classification Search
CPC ... H04W 28/04; H04W 72/04; H04W 72/042; H04W 88/08; H04L 5/0007
(Continued)

(56) References Cited

U.S. PATENT DOCUMENTS

| 10,356,656 B2 * | 7/2019 | Lee | H04W 72/1284 |
| 2011/0199991 A1 * | 8/2011 | Harris | H04W 72/1263 370/329 |

(Continued)

OTHER PUBLICATIONS

3GPP TSG RAN WG2 #70, R2-102816, Agenda Item: 7.1.9, Source: ZTE, Title: BSR reporting scheme, May 10-14, 2010 (Year: 2010).*
3GPP TSG-RAN WG2 Meeting #70, R2-102805, Agenda Item: 7.1.9, Source: Nokia Corpn, Title: BSR for Carrier Aggregation, May 10-14, 2010. (Year: 2010).*
International Search Report issued in corresponding application No. PCT/JP2016/064242 dated Jul. 12, 2016 (3 pages).
(Continued)

*Primary Examiner* — Peter G Solinsky
*Assistant Examiner* — Sanjay K Dewan
(74) *Attorney, Agent, or Firm* — Osha Liang LLP

(57) ABSTRACT

The present invention is designed so that communication can be carries out adequately even when the number of component carriers that can be configured in a user terminal is expanded from that in existing systems. According to one aspect of the present invention, a user terminal communicates by using a plurality of component carriers (CCs), and has a data buffering section that stores uplink data, a generating section that generates a BSR MAC CE (Medium Access Control Control Element), in which a given index corresponding to a buffer size is included, based on BSR (Buffer Status Report) tables, in which amounts of uplink data that is stored (buffer sizes) and indices are associated, and a transmission section that transmits the BSR MAC CE, and one of the BSR tables is a first BSR table for use when more than five CCs are configured in the user terminal.

3 Claims, 17 Drawing Sheets

(52) U.S. Cl.
CPC ..... *H04W 72/048* (2013.01); *H04W 72/1284* (2013.01); *H04L 5/001* (2013.01)

(58) Field of Classification Search
USPC .......................................................... 370/329
See application file for complete search history.

(56) References Cited

U.S. PATENT DOCUMENTS

| | | | | |
|---|---|---|---|---|
| 2011/0292873 A1* | 12/2011 | Guo | ..................... | H04L 5/0007 370/328 |
| 2012/0113922 A1* | 5/2012 | Kim | .................. | H04W 72/1284 370/329 |
| 2013/0016615 A1* | 1/2013 | Shi | .................... | H04W 72/1284 370/241 |
| 2013/0058220 A1* | 3/2013 | Yi | ..................... | H04W 72/1284 370/241 |
| 2014/0177560 A1* | 6/2014 | Guo | .................. | H04W 72/1268 370/329 |
| 2017/0245171 A1* | 8/2017 | Jung | ................. | H04W 72/0413 |
| 2018/0279162 A1* | 9/2018 | Yi | ..................... | H04W 28/0278 |
| 2019/0150025 A1* | 5/2019 | Ohta | ..................... | H04W 88/02 370/329 |

OTHER PUBLICATIONS

Written Opinion of the International Searching Authority issued in corresponding application No. PCT/JP2016/064242 dated Jul. 12, 2016 (3 pages).
3GPP TS 36.300 V12.4.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)"; Dec. 2014 (251 pages).
Extended European Search Report issued in counterpart European Patent Application No. 16792772.2, dated Nov. 30, 2018 (9 Pages).
Nokia Siemens Networks, Nokia Corporation; "BSR for Carrier Aggregation"; 3GPP TSG-RAN WG2 Meeting #70 R2-102805; Montreal, Canada, May 10-14, 2010 (2 Pages).
Huawei; "Buffer Size Table for CA"; 3GPP TSG-RAN WG2 Meeting #70bis R2-103755; Stockholm, Sweden, Jun. 28-Jul. 2, 2010 (8 Pages).
ZTE; "BSR reporting scheme"; 3GPP TSG RAN WG2 #70 R2-102816; Montreal, Canada, May 10-14, 2010 (3 Pages).
Office Action issued in Japanese Application No. 2017-517999; dated Sep. 1, 2020 (6 pages).

* cited by examiner

LCID VALUES FOR UL-SCH

| Index | LCID values |
|---|---|
| 00000 | CCCH |
| 00001-01010 | Identity of the logical channel |
| 01011-11000 | Reserved |
| 11001 | Extended Power Headroom Report |
| 11010 | Power Headroom Report |
| 11011 | C-RNTI |
| 11100 | Truncated BSR |
| 11101 | Short BSR |
| 11110 | Long BSR |
| 11111 | Padding |

FIG. 2

Rel.10-12 BS table

| Index | BS value [bytes] |
|---|---|
| 0 | BS = 0 |
| 1 | 0 < BS <= 10 |
| 2 | 10 < BS <= 13 |
| 3 | 13 < BS <= 16 |
| 4 | 16 < BS <= 19 |
| 5 | 19 < BS <= 23 |
| ... | ... |
| 60 | 1613447 < BS <= 1984009 |
| 61 | 1984009 < BS <= 2439678 |
| 62 | 2439678 < BS <= 3000000 |
| 63 | BS > 3000000 |

FIG. 3

Enhanced extended Buffer size levels for BSR

| Index | BS value [bytes] | Index | BS value [bytes] |
|---|---|---|---|
| 0 | BS = 0 | ... | ... |
| 1 | 0 < BS <= 10 | ... | ... |
| 2 | 10 < BS <= 13 | ... | ... |
| 3 | 13 < BS <= 17 | ... | ... |
| 4 | 17 < BS <= 21 | 52 | 1461433 < BS <= 1853849 |
| 5 | 21 < BS <= 26 | 53 | 1853849 < BS <= 2351635 |
| 6 | 26 < BS <= 33 | 54 | 2351635 < BS <= 2983084 |
| 7 | 33 < BS <= 42 | 55 | 2983084 < BS <= 3784086 |
| 8 | 42 < BS <= 53 | 56 | 3784086 < BS <= 4800170 |
| 9 | 53 < BS <= 68 | 57 | 4800170 < BS <= 6089087 |
| 10 | 68 < BS <= 86 | 58 | 6089087 < BS <= 7724097 |
| 11 | 86 < BS <= 108 | 59 | 7724097 < BS <= 9798132 |
| 12 | 108 < BS <= 137 | 60 | 9798132 < BS <= 12429077 |
| 13 | 137 < BS <= 174 | 61 | 12429077 < BS <= 15766469 |
| 14 | 174 < BS <= 221 | 62 | 15766469 < BS <= 20000000 |
| 15 | 221 < BS <= 280 | 63 | BS > 20000000 |

FIG. 5

Enhanced extended Buffer size levels for BSR X=7

| Index | BS value [bytes] | Index | BS value [bytes] |
|---|---|---|---|
| 0 | BS = 0 | ... | ... |
| 1 | 0 < BS <= 10 | ... | ... |
| 2 | 10 < BS <= 12 | ... | ... |
| 3 | 12< BS <= 13 | ... | ... |
| 4 | 13 < BS <= 15 | 116 | 7036487 < BS <= 7902493 |
| 5 | 15 < BS <= 16 | 117 | 7902493 < BS <= 8875081 |
| 6 | 16 < BS <= 18 | 118 | 8875081 < BS <= 9967370 |
| 7 | 18 < BS <= 21 | 119 | 9967370 < BS <= 11194091 |
| 8 | 21 < BS <= 23 | 120 | 11194091 < BS <= 12571788 |
| 9 | 23 < BS <= 26 | 121 | 12571788 < BS <= 14119044 |
| 10 | 26 < BS <= 29 | 122 | 14119044 < BS <= 15856726 |
| 11 | 29 < BS <= 32 | 123 | 15856726 < BS <=17808271 |
| 12 | 32 < BS <= 36 | 124 | 17808271 < BS <= 20000000 |
| 13 | 36 < BS <= 41 | 125 | 12429077 < BS <= 15766469 |
| ... | ... | 126 | 15766469 < BS <= 20000000 |
| ... | ... | 127 | BS > 20000000 |

Short BSR/Truncated BSR MAC CE for one LCG

| LCG ID | R | R | R | R | Buffer Size | | R | Oct 1 / Oct 2 |

FIG. 7B

Long BSR MAC CE for all LCGs

| R | R | R | Buffer Size #0 | | Oct 1 |
| Buffer Size #0 | | | | | Oct 2 |
| BS #1 | Buffer Size #1 | | | | Oct 3 |
| BS #2 | Buffer Size #2 | Buffer Size #3 | | | Oct 4 |

Rel-10 BS table

| Index | BS value [bytes] |
|---|---|
| 0 | BS = 0 |
| 1 | 0 < BS <= 10 |
| 2 | 10 < BS <= 13 |
| 3 | 13 < BS <= 16 |
| 4 | 16 < BS <= 19 |
| 5 | 19 < BS <= 23 |
| ... | ... |
| 60 | 1613447 < BS <= 1984009 |
| 61 | 1984009 < BS <= 2439678 |
| 62 | 2439678 < BS <= 3000000 |
| 63 | BS > 3000000 |

FIG. 8A

New BS table for BS > 3000 Kbytes

| Index | BS value [bytes] | Index | BS value [bytes] |
|---|---|---|---|
| 0 | 3000000 < BS <= 3354181 | 11 | 11447322 < BS <= 12798796 |
| 1 | 3354181 < BS <= 3750177 | 12 | 12798796 < BS <= 14309826 |
| 2 | 3750177 < BS <= 4192924 | 13 | 14309826 < BS <= 15999248 |
| 3 | 4192924 < BS <= 4687941 | 14 | 15999248 < BS <= 17888124 |
| 4 | 4687941 < BS <= 5241401 | 15 | 17888124 < BS <= 20000000 |
| 5 | 5241401 < BS <= 5860202 | 16 | BS > 20000000 |
| 6 | 5860202 < BS <= 6552059 | 17 | Reserved |
| 7 | 6552059 < BS <= 7325597 | 18 | Reserved |
| 8 | 7325597 < BS <= 8190459 | ... | ... |
| 9 | 8190459 < BS <= 9157427 | 62 | Reserved |
| 10 | 9157427 < BS <= 10238556 | 63 | Reserved |

FIG. 8B

LCID VALUES FOR UL-SCH

| Index | LCID values |
|---|---|
| 00000 | CCCH |
| 00001-01010 | Identity of the logical channel |
| 01011-10100 | Reserved |
| 10101 | Truncated BSR using New BS table for BS > 3000 Kbytes |
| 10110 | Short BSR using New BS table for BS > 3000 Kbytes |
| 10111 | Long BSR using New BS table for BS > 3000 Kbytes |
| 11000 | Dual Connectivity Power Headroom Report |
| 11001 | Extended Power Headroom Report |
| 11010 | Power Headroom Report |
| 11011 | C-RNTI |
| 11100 | Truncated BSR |
| 11101 | Short BSR |
| 11110 | Long BSR |
| 11111 | Padding |

FIG. 10

USER TERMINAL AND RADIO BASE STATION

TECHNICAL FIELD

The present invention relates to a user terminal, a radio base station, a radio communication method and a radio communication system in a next-generation mobile communication system.

BACKGROUND ART

In the UMTS (Universal Mobile Telecommunications System) network, the specifications of long term evolution (LTE) have been drafted for the purpose of further increasing high speed data rates, providing lower delays and so on (see non-patent literature 1). Also, successor systems of LTE (referred to as, for example, "LTE-A" (LTE-Advanced), "FRA" (Future Radio Access) and so on) are under study for the purpose of achieving further broadbandization and increased speed beyond LTE.

Carrier aggregation (CA) is one wideband technology in LTE-A (LTE Rel. 10 to 12). CA makes it possible to use a plurality of fundamental frequency blocks as one in communication. The fundamental frequency blocks in CA are referred to as "component carriers" (CCs), and are equivalent to the system band in LTE Rel. 8.

Also, in LTE/LTE-A, when uplink data to be transmitted is produced, a user terminal (UE) sends a buffer status report (BSR), which shows the buffer size of this uplink data, to the device on the network end (for example, a radio base station (eNB)). The radio base station can control the allocation of uplink radio resources adequately based on the BSR.

CITATION LIST

Non-Patent Literature

Non-Patent Literature 1: 3GPP TS 36.300 "Evolved Universal Terrestrial Radio Access (E-UTRA) and Evolved Universal Terrestrial Radio Access Network (E-UTRAN); Overall Description; Stage 2"

SUMMARY OF INVENTION

Technical Problem

In CA in LTE Rel. 10 to 12, the number of CCs that can be configured per user terminal is limited to maximum five. Meanwhile, in LTE Rel. 13 and later versions, a study is in progress to soften the limit of the number of CCs that can be configured per user terminal, and allow six or more CCs (more than five CCs) to be configured, in order to enable more flexible and faster radio communication. Here, the carrier aggregation is which six or more CCs can be configured may be referred to as, for example, enhanced, Rel. 13 CA and so on.

However, when the number of CCs that can be configured in a user terminal is enhanced to six or more (for example, 32), it becomes difficult to use the BSRs of existing systems (Rel. 10 to 12) on an as-is basis. For example, since the premise of existing systems is that the buffer size represented by the BSR only supports CA with five or fewer CCs, when CA is used among six or more CCs, there is a threat that the buffer size cannot be represented adequately. Consequently, there is a fear that radio base stations are unable to control the allocation of uplink radio resources for user terminals adequately, and the effect of improving throughput by means of enhanced CA cannot be achieved in an optimal fashion.

The present invention has been made in view of the above, and it is therefore an object of the present invention to provide a user terminal and a radio base station that enable adequate communication even when the number of component carriers that can be configured in a user terminal is expanded from that of existing systems.

Solution to Problem

According to one aspect of the present invention, a user terminal communicates by using a plurality of component carriers (CCs), and has a data buffering section that stores uplink data, a generating section that generates a BSR MAC CE (Medium Access Control Control Element), in which a given index corresponding to a buffer size is included, based on BSR (Buffer Status Report) tables, in which amounts of uplink data that is stored (buffer sizes) and indices are associated, and a transmission section that transmits the BSR MAC CE, and, in this user terminal, one of the BSR tables is a first BSR table for use when more than five CCs are configured in the user terminal.

Advantageous Effects of Invention

According to the present invention, communication can be carried out adequately even when the number of component carriers that can be configured in a user terminal is expanded from that of existing systems.

BRIEF DESCRIPTION OF DRAWINGS

FIG. 2 is a diagram to show examples of LCID values used for an uplink shared channel in existing LTE systems;

FIG. 3 is a diagram to show a BSR table in an existing LTE system;

FIG. 5 is a diagram to show an example of a BSR table according to method 1 of the first embodiment;

FIG. 6 is a diagram to show an example of a BSR table according to method 2 of the first embodiment;

FIG. 7 provide diagrams to show examples of structures of BSR MAC CEs according to method 2 of the first embodiment;

FIG. 8 provide diagrams to show examples of BSR tables according to method 3 of the first embodiment;

FIG. 10 is a diagram to show examples of LCID values used for an uplink shared channel in a variation of the first embodiment;

DESCRIPTION OF EMBODIMENTS

First, the BSRs of existing LTE systems (Rel. 10 to 12) will be described.

The buffer size to report in BSRs is calculated per logical channel group (LCG) where data is present. Each LCG is comprised of one or more logical channels (LCHs), and the maximum number of LCGs is four. Note that information about the relationships between LCHs and LCGs may be reported to user terminals by using higher layer signaling (for example, RRC (Radio Resource Control) signaling, broadcast signals (for example, MIBs (Master Information Blocks), SIBs (System Information Blocks))), and so on.

BSRs are transmitted via MAC (Medium Access Control) signaling by using the PUSCH (Physical Uplink Shared Channel). For example, a user terminal transmits a BSR when data that can be transmitted is present in an LCH belonging to an LCG and a predetermined timer expires. A BSR is constituted by BSR MAC CEs (Control Elements) contained in a MAC PDU (Protocol Data Unit).

Figure 1B:
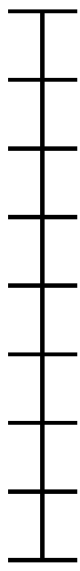
FIG. 1 provide diagrams to show structures of BSR MAC CEs in existing LTE systems.
Figure 1A:
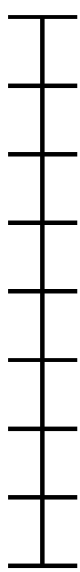

FIG. 1 show structures of BSR MAC CEs in existing LTE systems. As shown FIG. 1, Rel. 10 to 12 set forth a BSR (short BSR/truncated BSR) that contains information about the buffer size of one LCG (specified by the LCG ID field), and a BSR (long BSR) that contains information about the buffer sizes of all LCGs (corresponding to LCG IDs #0 to #3).

Also, in the LCIDs (Logical Channel Identifiers) contained in the MAC header of the MAC PDU, values that correspond to each BSR MAC CE are placed. FIG. 2 is a diagram to show examples of LCID values used for an uplink shared channel of existing LTE systems. Referring to FIG. 2, the indices "11100," "11101" and "11110" all correspond to varying BSR MAC CEs.

The buffer size (BS) field shown in FIG. 1 accommodates a six-bit index, and defines the relationship between this index and the buffer size (also referred to as a "BSR table," "BS table" and so on). FIG. 3 is a diagram to show a BSR table in an existing LTE system. The BSR table of FIG. 3 is the table set forth in Rel. 10. Note that the buffer sizes in FIG. 3 may be also referred to as "enhanced buffer sizes."

In a BSR table, the indices "000000" and "111111" indicate that the buffer is empty and that the buffer is full, respectively. The maximum buffer size value $B_{max}$ is calculated based on the maximum uplink transport block size (TBS), the RTT (Round Trip Time) response time, the number of CCs, uplink MIMO (Multi-Input Multi-Output), and so on.

For example, according to Rel. 10, the maximum uplink TBS is 149776 bits, the response time of two RTTs is 16 TTIs (Transmission Time Intervals), the maximum number of CCs is five, and uplink MIMO uses maximum two layers, and it then follows that (149776*16*5*2)/8=2995520 bytes are required for the maximum buffer size. Consequently, as shown in FIG. 3, in the BSR table of Rel. 10, $B_{max}$ is defined to be 3 MB (3000000 bytes), which exceeds 2995520 bytes.

Also, in the BSR table, a buffer size $B_k$ to correspond to a BS level k can be derived from following equation 1. Note that k is (index −1).

$$B_k = \lceil B_{min}(1+p)^k \rceil, \qquad \text{(Equation 1)}$$

$$\text{where } p = \left(\frac{B_{max}}{B_{min}}\right)^{\frac{1}{N-1}} - 1,$$

$$k = 0, \ldots, N-1$$

Here, $B_{min}$ is 10 B (bytes), $B_{max}$ is 3 MB and $N=2^6-2=62$. Also, taking $(B_{k+1}-B_k)/B_{k+1}$ as a whole, the granularity (step size) of the buffer size represented thus can be determined from $$1 - \frac{1}{\lceil 1+p \rceil},$$

and is approximately 18% in the case of FIG. 3.

Now, in LTE Rel. 13, CA to configure six or more CCs (more than five CCs) (referred to as "enhanced CA," "Rel. 13 CA," etc.) is under study. For example, Rel. 13 CA is studied for bundling maximum 32 CCs.

It is likely that Rel. 13 CA to use many CCs like this holds a close relationship to the operation of LAA (Licensed-Assisted Access), which is also under study under Rel. 13. LAA is one mode of LTE system that is premised on cooperation with licensed band LTE (licensed LTE), and that uses frequency bands where license is not required (unlicensed bands) (LTE-U: LTE Unlicensed).

While a licensed band refers to a band in which a specific operator is allowed exclusive use, an unlicensed band refers to a band which is not limited to a specific operator and in which radio stations can be provided. For unlicensed bands, for example, the 2.4 GHz band and the 5 GHz band where Wi-Fi and Bluetooth (registered trademark) can be used, and the 60 GHz band where millimeter-wave radars can be used are under study for use.

Also, regarding uplink transmission in LAA systems, a study is in progress to decide to either manage an offload to LAA SCells (secondary cells) or provide services only through licensed carriers, on a per bearer/logical channel basis.

Figure 4:
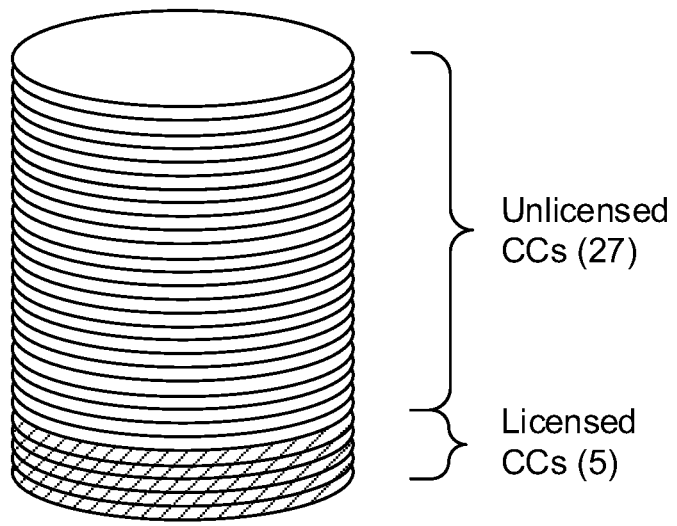
FIG. 4 is a diagram to show an example of Rel. 13 CA.

FIG. 4 is a diagram to show an example of Rel. 13 CA. FIG. 4 illustrates CA to use a total of 32 CCs, where the licensed CCs of LAA are comprised of five CCs, which is the maximum number of CCs in existing systems, and where the unlicensed CCs are comprised of 27 CCs. By using Rel. 13 CA, more improved communication throughput can be expected.

However, since, as mentioned earlier, the BSRs of existing systems (Rel. 10 to 12) presume CA with five or fewer CCs, when CA uses six or more CCs, large buffer sizes cannot be represented adequately, and there is a threat that the effect of improving throughput by means of enhanced CA cannot be achieved in an optimal fashion.

So, in order to make it possible to report BSRs that are suitable for the CA of LTE Rel. 13 and later versions that uses six or more CCs (for example, 32 CCs), the present inventors have come up with the idea of introducing BSR tables, BSR MAC CEs and/or MAC header structures that are different from those of existing systems.

Now, embodiments of the present invention will be described below in detail. Now, although example cases will be described with the following embodiments in which CA to use maximum 32 CCs is configured in user terminals, the application of the present invention is by no means limited to this. For example, the BSRs that will be described with each embodiment below can be used even when CA is configured with five or fewer CCs.

Also, in each embodiment, the maximum buffer size value $B_{max}$ of Rel. 13 is determined, assuming maximum 32 CCs, based on the same calculation method as in Rel. 10. That is, although each embodiment below will be described assuming that $B_{max}$=20 MB ((149776*16*32*2)/8) holds, this is by no means limiting, and $B_{max}$ can have any other values as long as such values allow adequate execution of Rel. 13 CA.

First Embodiment: BSR Table for Rel. 13 CA

With the first embodiment of the present invention, a new BSR table for Rel. 13 CA is set forth and used. This table is referenced when, for example, BSRs are generated with respect to a user terminal in which more than five CCs are configured. Also, even when five or fewer CCs are configured, it is possible to use this new BSR table if the number of CCs configured is not supported by the CA of Rel. 12 or earlier versions. For example, when TDD (Time Division Duplex) is configured in the PCell (Primary Cell) and a UL-DL configuration to make its DL-UL resource ratio 9:1 is applied, the CA of Rel. 12 or earlier versions can support only two CCs at a maximum. Consequently, in this case, the new BSR table can be used in arbitrary CA with three or more CCs.

<Method 1>

Method 1 of the first embodiment is structured so that, while the index (of the BS field) is kept six bits as in existing systems, each buffer size of the BSR table is made a greater value, so that values up to $B_{max}$ of Rel. 13 can be represented. Each buffer size can be calculated by using, for example, equation 1. FIG. 5 is a diagram to show an example of the BSR table according to method 1 of the first embodiment. The granularity (step size) of buffer sizes represented therein is approximately 21% in the case of FIG. 5.

That is, method 1 implements the same index size (six bits) as in existing BSR tables by making the step size greater than in the BSR table of LTE Rel. 10. Note that, as mentioned earlier, the step size is the rate the buffer size increases following an increase of the index.

Information as to which of the tables of FIG. 3 and FIG. 5 is used (information as to whether or not the BSR table for Rel. 13 is used) may be reported to user terminals by using higher layer signaling (for example, RRC signaling), DCI and so on. Also, the user terminals may be structured to implicitly decide to use the table of FIG. 5 when Rel. 13 CA (for example, CA with more than five CCs) is configured.

In method 1, each LCG's buffer size can be reported by using the same LCIDs as in existing systems. Also, the size of the BS field is six bits and is also the same as in existing systems, the BSR MAC CEs can be structured as shown in FIG. 1. That is, the BSR MAC CEs can be provided in the same structure (the same size) as the BSR MAC CEs of LTE Rel. 10.

As described above, with method 1, only a new BSR table with increased buffer sizes needs to be introduced, and there is no need to change the MAC PDU, so that it is possible to maintain compatibility with existing systems and still support the buffer sizes of Rel. 13 CA.

<Method 2>

With method 2 of the first embodiment, the number of index bits (in the BS field) is made greater than in existing systems. To be more specific, method 2 of the first embodiment is structured to make the number of bits of the BS field X (X>6), so that the BSR table can be enhanced and values can be represented up to $B_{max}$ of Rel. 13. Each buffer size may be calculated by using, for example, equation 1.

FIG. 6 is diagram to show an example of a BSR table according to method 2 of the first embodiment. FIG. 6 shows an example in which X=7 holds. Here, in FIG. 6, N in equation 1 is 126, and is calculated by $N=2^x-2$, as heretofore up to Rel. 10. The granularity of buffer sizes represented therein is approximately 11% in the case of FIG. 6.

That is, with method 2, the indices are formed with X bits (X>6), and the step size is equal to or smaller (or smaller) than in the BSR table of LTE Rel. 10, so that more finely detailed BSRs can be reported.

Information as to which of the tables of FIG. 3 and FIG. 6 is used (information as to whether or not the BSR table for Rel. 13 CA is used) may be reported to user terminals by using higher layer signaling (for example, RRC signaling), DCI and so on. Also, the user terminals may be structured to implicitly decide to use the table of FIG. 6 when Rel. 13 CA (for example, CA with six or more CCs) is configured.

According to method 2, each LCG's buffer size can be reported by using the same LCIDs as in existing systems. Meanwhile, the size of the BS field is bigger than in existing systems, so that the structures of BSR MAC CEs need to be changed. The user terminals use BSR MAC CEs such as those described below, when deciding to use a table with an increased number of indices (for example, FIG. 6).

FIG. 7 provide diagrams to show examples of the structures of BSR MAC CEs according to method 2 of the first embodiment. FIG. 7 show examples in which X=7 holds. In this example, the BSR (short BSR/truncated BSR) that corresponds to one LCG requires at least nine bits, and the BSR (long BSR) that corresponds to all LCGs require at least 28 bits. However, given that MAC CEs need to be structured in octets (bytes), with these examples, the former is structured with two octets, and the latter is structured with four octets.

Note that, "R" stands for reserved bits, which do not necessarily have to be used to report information, and can be used freely. For the specification, "R" may be fixed to a predetermined value (for example, 0). When a predetermined value is used on a fixed basis, it is possible to see this bit as a virtual error detection bit in the error correction decoding stage (that is, if this bit does not assume the predetermined value, it is then possible to judge that the whole MAC CE is an error, and request retransmission).

In this way, with method 2, the BSR MAC CEs are provided in different structures (larger size size) from the BSR MAC CEs of LTE Rel. 10.

Note that, with methods 1 and 2, it is possible to set forth terminal capability information (UE capability) that indicates a new BSR can be configured (a new BSR table can be used), apart from the terminal capability information (UE capability) that allows configuration of CA with more than five CCs, and to report this from terminals to base stations in advance by using higher layer signaling and so on. The method of using this terminal capability information will be described below.

In Rel. 13 CA, the motives for configuring many CCs in include, apart from improving terminal throughput significantly, dynamically switching the carrier to actually schedule among many frequency carriers, and flexibly changing the carrier to use depending on interference, the congestion of frequency bands and so on, and methods to make these possible are under study. To achieve the former motive, it is necessary to configure many CCs and schedule these at the same time, and therefore it is necessary to use a new BSR table. On the other hand, the latter can be achieved without scheduling many CCs at the same time.

Consequently, by introducing terminal capability information (UE capability) that indicates that a new BSR can be configured, the base station end can recognize a terminal implementation that does not implement a new BSR but that nevertheless implements UL-CA with many CCs. In other words, it becomes possible to remove implementations for achieving high terminal throughput, which require new BSRs, from terminals, and implement UL-CA that configures many CCs in simpler implementation, so as to implement UL-CA only for the purpose of achieving the latter motive.

Consequently, assuming that the terminal capability information to indicate that a new BSR can be configured is reported from a user terminal, a radio base station may be structured to configure a new BSR in the user terminal (or report information as to whether or not to use a new BSR table to the user terminal). For example, when the terminal capability information to indicate that CA with more than five CCs can be configured and the terminal capability information to indicate that a new BSR can be configured are both reported from a user terminal, the radio base station configures a new BSR.

Also, in methods 1 and 2, a UE may decide which BSR table to use, based on the number of CCs that are active (that is, activated). SCells—not including PCells or PSCells (Primary Secondary Cells)—are made deactive (that is, de-activated) in accordance with a timer or signaling from a radio base station. When there are five or fewer active CCs, it is not necessary to use a new BSR table. Consequently, the UE can select the table to use to calculate BSRs depending on the number of active CCs.

By this means, according to method 1, when the number of active CCs is large, although the step size also becomes bigger, the maximum buffer size can be expanded by using a new BSR table, and, when there are a small number of active CCs, it is possible to make the step size finer, instead of using a maximum buffer size that is more than necessary.

Also, according to method 2, when the number of active CCs is large, it is possible to increase the size of MAC CEs and expand the maximum buffer size by using a new BSR table, and, when there are a small number of active CCs, it is possible to reduce the overhead of MAC CEs, instead of using a maximum buffer size that is more than necessary.

As described above, method 2 can support the buffer sizes of Rel. 13 CA by enhancing the BS field, while reducing the increase of step size.

<Method 3>

Method 3 of the first embodiment is structured to switch between and use a plurality of tables, so that it is possible to provide an enhanced BSR table and represent values up to $B_{max}$ for Rel. 13. Among these multiple tables, one table contains information that represents buffer sizes that are bigger than the maximum buffer sizes of the other tables.

For example, the BSR table of an existing system (for example, Rel. 10) can be used as one of a plurality of tables. In this case, tables that show BSs that are bigger than $B_{max}$ of Rel. 10, up to $B_{max}$ for Rel. 13, can be used other tables.

FIG. 8 provide diagrams to show examples of BSR tables according to method 3 of the first embodiment. With this example, the tables of FIG. 8A and FIG. 8B are switched and used. The table of FIG. 8A is the table of Rel. 10 shown in FIG. 3, and is used to represent buffer sizes up to 3 MB. On the other hand, the table of FIG. 8B is used to represent buffer sizes beyond 3 MB (3000 KB), which is the maximum buffer size in FIG. 8A, up to 20 MB, which is the maximum buffer size in Rel. 13. In the table of FIG. 8B, each buffer size may be calculated by, for example, using equation 2.

$$B_k = \lceil B_{min}(1+p)^k \rceil, \quad \text{(Equation 2)}$$
$$\text{where } p = \left(\frac{B_{max}}{B_{min}}\right)^{\frac{1}{N}} - 1,$$
$$k = 1, \ldots, N$$

Here, $B_{min}$ is 3 MB, and $B_{max}$ is 20 MB.

In the table of FIG. 8B, it is not necessary to set forth every index with a corresponding buffer size. That is, N is not limited to $2^x-2$. In the event of FIG. 8B, N=17 holds. The granularity of buffer sizes represented therein is approximately 11% in the case of FIG. 8B. Note that, although k is (index+1) in equation 2, this is by no means limiting.

Part of the indices may be configured to show "reserved" to allow more diversified use. The buffer size value of "reserved" may be, for example, configurable by higher layer signaling. In FIG. 8B, the indices values from 17 and above are shown as "reserved."

Information as to which of the tables of FIG. 8A and FIG. 8B is used (information as to whether or not to use the BSR table for Rel. 13 CA) may be reported to user terminals by using higher layer signaling (for example, RRC signaling), DCI and so on. Also, user terminals may be structured to implicitly decide to use the table of FIG. 8B when Rel. 13 CA (for example, CA with six or more CCs) is configured.

Also, the user terminals may be structured to be capable of dynamically changing which of the tables of FIG. 8A and FIG. 8B to use, regardless of whether or not reports are sent. In this case, in the MAC PDU subheader to correspond to a BSR MAC CE, information (specifying information) that specifies the BSR table that has been used to generate this BSR MAC CE is included and reported to a radio base station.

Figure 9:
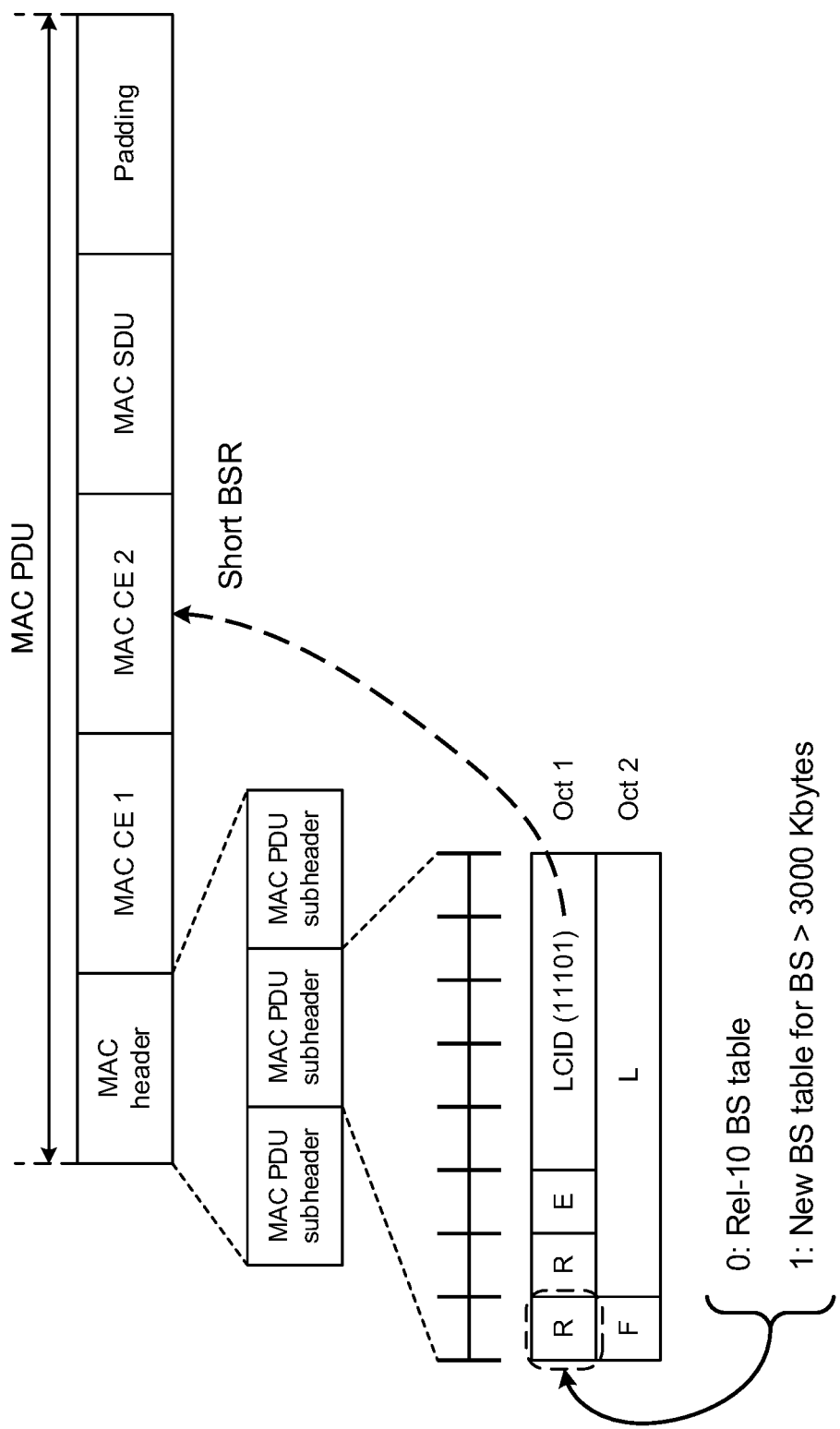
FIG. 9 is a diagram to show an example of a MAC PDU according to method 3 of the first embodiment.

For example, when the type of BSR MAC CEs is represented by using the same LCIDs as those of existing systems, the BSR-table-specifying information is included in the R field in MAC PDU subheaders. FIG. 9 is a diagram to show an example of a MAC PDU according to method 3 of the first embodiment. Note that, in FIG. 9, the fields "E," "F" and "L" included in the MAC PDU subheaders may be the same as the corresponding fields in existing systems. Also, the structure of MAC PDU subheaders is by no means limited to this.

In FIG. 9, one of the MAC PDU subheaders shows that MAC CE 2 is a short BSR (LCID=11101). Also, in the first R field in this subheader, the BSR table to use for MAC CE 2 is specified. In this example, the table of Rel. 10 is used when this R field "0," and the table of FIG. 8B showing values beyond 3 MB is used when this R field is "1."

Note that, when the MAC PDU contains a plurality of BSR MAC CEs, the same table may be used for each BSR MAC CE, or different tables may be used.

As described above, by using a plurality of BSR tables, method 3 makes it possible to support the buffer sizes of Rel. 13 CA, while maintaining compatibility with existing systems and making the granularity of buffer sizes that can be reported high.

As described above, according to the first embodiment, it is possible to report BSRs that support large buffer sizes to radio base stations, even when CA with more than five CCs is employed.

(Variation)

Note that the examples that have been described with the first embodiment are simply examples, and the BSR table structures and the MAC PDU structures thereof are by no means limiting. Although $B_{max}$ of Rel. 13 has been set to 20 MB (which supports maximum 32 CCs) in the above-described examples, this value has only to be calculated based on the maximum number of CCs to be configured in user terminals, and other values can be used as well. For example, if there are user terminals in which maximum 8 CCs, 12 CCs, 16 CCs, 20 CCs, 24 CCs and 28 CCs can be configured, the new BSR table for Rel. 13, for example, may configure $B_{max}$ to 5 MB, 8 MB, 10 MB, 12 MB, 15 MB and 17 MB, respectively. Also, buffer sizes and indices may be linked with each other so that buffer sizes up to $B_{max}$=40 MB (for example, maximum 64 CCs) or $B_{max}$=80 MB can be specified.

Although a case has been shown with FIG. 8 where two BSR tables are switched and used, it is also possible to use three or more tables. Also, in this case, a BSR table may be specified by using a plurality of R fields contained in a MAC PDU subheader. That is, the specifying information may be information to specify one of three or more tables.

Also, although a case has been shown with FIG. 8 where two BSR tables share the same index size of six bits, this is by no means limiting. For example, the table of FIG. 8B showing values beyond 3 MB may be structured to use indices bigger than six bits, as has been shown with method 2.

Also, a BSR table may be specified by way of designating LCIDs that are not used in existing systems (Rel. 10 to 12), not based on the R field. That is, for example, predetermined LCIDs may be included in the MAC header of the MAC PDU to indicate that this MAC PDU contains the BSR MAC CEs of the first embodiment.

FIG. 10 is a diagram to show examples of LCID values used for an uplink shared channel in a variation of the first embodiment. In FIG. 10, the indices "10101," "10110" and "10111" correspond to BSR MAC CEs that can support BSRs beyond 3 MB (3000 KB), as has been described above with method 3. Note that the LCIDs to represent these BSR MAC CEs are not limited to the structure of FIG. 10, and may be, for example, allocated to other indices.

Also, information related to the structures of BSR tables may be reported to radio base stations and/or user terminals. For example, the information related to the structures of BSR tables may include information that defines buffer sizes that correspond to predetermined indices, and the radio base stations and/or the user terminals may update the information contained in predetermined BSR tables based on this structural information.

Also, in accordance with method 3, the user terminals may report terminal capability information that indicates that a new BSR can be configured, to the radio base stations. In this case, the radio base stations and/or the user terminal may apply the same control (including configuration, selection, reporting and so on) as method 1 and/or method 2 described above, or may apply different control. Also, in each method, the information as to whether or not to use the BSR table for Rel. 13 CA may be referred to as "table switching information," "buffer size switching information," and so on.

Second Embodiment: Expansion of the Number of LCGs

While working on BSR structures for Rel. 13 CA, the present inventors have found out that the maximum number of LCGs at present (=4) may be insufficient to support bearers of different characteristics such as licensed carriers/unlicensed carriers in LAA. For example, when CCs as many as shown in FIG. 4 are configured in an environment in which the number of LCGs is four, it might occur that a carrier of good quality and a carrier of poor quality are constituted by the same LCG, and the throughput is damaged.

So, the present inventors have worked on making the number of LCGs greater than four, and arrived at the second embodiment. With the second embodiment, the number of LCGs that can be configured is increased compared to existing systems. To be more specific, the second embodiment is structured to make the maximum number of LCGs Y (Y>4), so BSRs to correspond to more than four LCGs can be represented.

The second embodiment makes the size of the LCG ID field in BSR MAC CEs bigger than in existing systems, or provides a larger number of BS fields than is existing systems, and therefore the structure of BSR MAC CEs needs to be changed. When a user terminal decides to use more than four LCGs, the user terminal then uses BSR MAC CEs such as those described below.

Figures 11A, 11B:
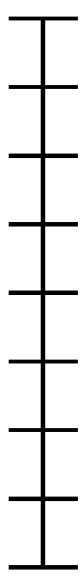
FIG. 11 provide diagrams to show examples of structures of BSR MAC CEs according a second embodiment.

FIG. 11 provide diagrams to show examples of structures of BSR MAC CEs according to the second embodiment. FIG. 11 show examples in which X (the BS field size)=8 and Y (the maximum number of LCGs)=5 hold. In this case, the BSR (short BSR/truncated BSR) to correspond to one LCG requires at least 11 bits, and the BSR (long BSR) to correspond to all LCGs (corresponding to LCG IDs #0 to #4) requires at least 40 bits. However, given that MAC CEs need to be structured in octets (bytes), with these examples, the former is structured with two octets (FIG. 11A), and the latter is structured with four octets (FIG. 11B). In FIG. 11A, the LCG ID field is expanded to a number of bits (three bits) that can represent Y LCG IDs.

Regarding the BSR table to use with respect to each LCG, it is possible to use the BSR table of Rel. 10 shown in FIG. 3, or use the BSR tables used in the methods shown with the first embodiment.

Information as to whether or not to use more than four LCGs may be reported to user terminals by using higher layer signaling (for example, RRC signaling), DCI and so on. Also, the user terminal may be structured to implicitly decide to use more than four LCGs when, for example, Rel. 13 CA (for example, CA with six or more CCs) is configured, CA that includes an unlicensed band is configured, CA that includes a CC to require carrier sensing is configured, relationships among four or more LCGs and LCHs are configured, and so on.

Figure 12:
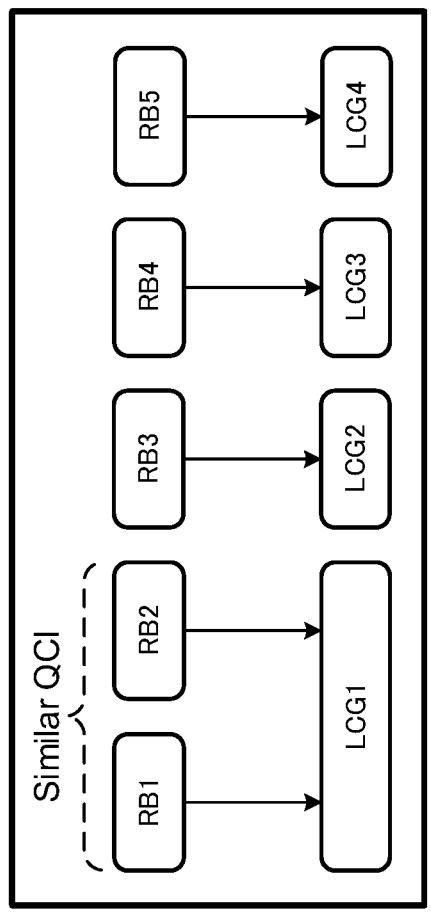
FIG. 12 is a diagram to show an example of an LCG structure that is implemented with the second embodiment.

FIG. 12 is a diagram to show examples of LCG structures that are implemented by the second embodiment. In FIG. 12, seven RBs (Radio Bearers) and six LCGs are shown. RBs 1 to 5 are licensed carriers, and RBs 6 and 7 are unlicensed carriers. In this example, RBs 1 and 2 are assigned the same QCI (QoS Class Identifier), and therefore constitute the same LCG (LCG 1). The other RBs constitute individual LCGs.

In this example, LCGs 1 to 4, which correspond to four LCGs in existing systems, are assigned to the licensed carriers, and LCGs 5 and 6, which are two newly defined LCGs, are assigned to the unlicensed carriers.

In this way, according to the second embodiment, the number of LCGs can be made greater than four, so that, even when the number of RBs is greater than four, it is still possible to apply finely-detailed control to each RB. Also, it is possible to reduce the situations in which the same LCG is configured for a licensed carrier and an unlicensed carrier, and to reduce the decrease of throughput.

Note that the radio communication methods of the above-described embodiments may be applied individually or may be applied in combination. For example, when more than four LCGs are used as described with the second embodiment, a structure to report BSRs on a per LCG basis based on the BSR table for Rel. 13 CA that has been shown with the first embodiment may be used.

(Radio Communication System)

Now, the structure of the radio communication system according to an embodiment of the present invention will be described below. In this radio communication system, the radio communication methods according to the above-described embodiments of the present invention are employed. Note that the radio communication methods of the above-described embodiments may be applied individually or may be applied in combination.

Figure 13:
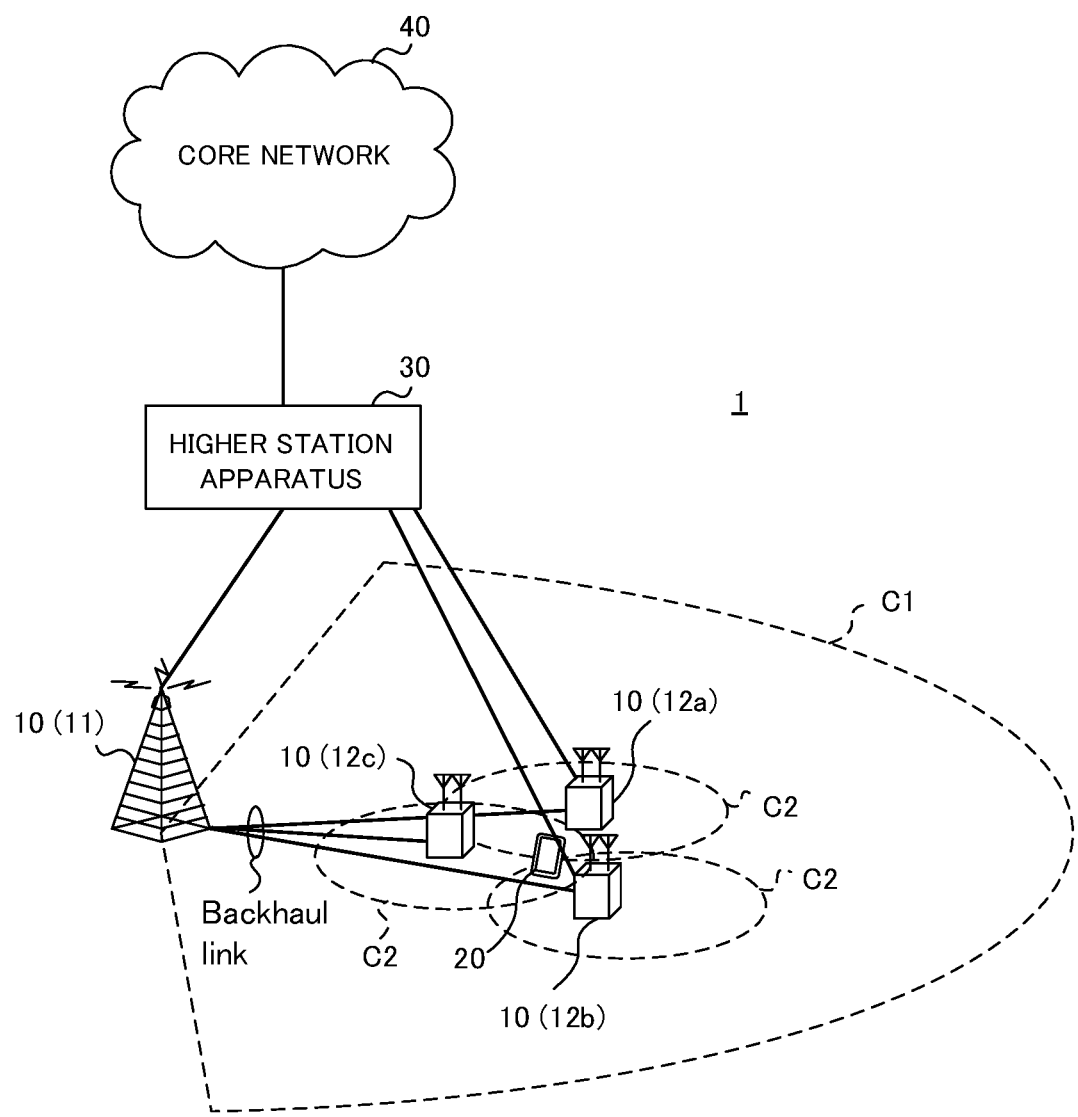
FIG. 13 is a diagram to show an example of a schematic structure of a radio communication system according to an embodiment of the present invention.

FIG. 13 is a diagram to show an example of a schematic structure of a radio communication system according to an embodiment of the present invention. The radio communication system 1 can adopt carrier aggregation (CA) and/or dual connectivity (DC) to group a plurality of fundamental frequency blocks (component carriers) into one, where the LTE system bandwidth (for example, 20 MHz) constitutes one unit. Note that the radio communication system 1 may be referred to as "SUPER 3G," "LTE-A" (LTE-Advanced), "IMT-Advanced," "4G," "5G," "FRA" (Future Radio Access) and so on.

The radio communication system 1 shown in FIG. 13 includes a radio base station 11 that forms a macro cell C1, and radio base stations 12 (12a to 12c) that form small cells C2, which are placed within the macro cell C1 and which are narrower than the macro cell C1. Also, user terminals 20 are placed in the macro cell C1 and in each small cell C2.

The user terminals 20 can connect with both the radio base station 11 and the radio base stations 12. The user terminals 20 may use the macro cell C1 and the small cells C2, which use different frequencies, at the same time, by means of CA or DC. Also, the user terminals 20 can execute CA or DC by using a plurality of cells (CCs) (for example, six or more CCs).

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Note that the configuration of the frequency band for use in each radio base station is by no means limited to these.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between two radio base stations 12).

The radio base station 11 and the radio base stations 12 are each connected with a higher station apparatus 30, and are connected with a core network 40 via the higher station apparatus 30. Note that the higher station apparatus 30 may be, for example, an access gateway apparatus, a radio network controller (RNC), a mobility management entity (MME) and so on, but is by no means limited to these. Also, each radio base station 12 may be connected with higher station apparatus 30 via the radio base station 11.

Note that the radio base station 11 is a radio base station having a relatively wide coverage, and may be referred to as a "macro base station," a "central node," an "eNB" (eNodeB), a "transmitting/receiving point" and so on. Also, the radio base stations 12 are radio base stations having local coverages, and may be referred to as "small base stations," "micro base stations," "pico base stations," "femto base stations," "HeNBs" (Home eNodeBs), "RRHs" (Remote Radio Heads), "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals or stationary communication terminals.

In the radio communication system 1, as radio access schemes, OFDMA (Orthogonal Frequency Division Multiple Access) is applied to the downlink, and SC-FDMA (Single-Carrier Frequency Division Multiple Access) is applied to the uplink. OFDMA is a multi-carrier communication scheme to perform communication by dividing a frequency band into a plurality of narrow frequency bands (subcarriers) and mapping data to each subcarrier. SC-FDMA is a single-carrier communication scheme to mitigate interference between terminals by dividing the system band into bands formed with one or continuous resource blocks per terminal, and allowing a plurality of terminals to use mutually different bands. Note that the uplink and downlink radio access schemes are by no means limited to the combination of these.

In the radio communication system 1, a downlink shared channel (PDSCH: Physical Downlink Shared CHannel), which is used by each user terminal 20 on a shared basis, a broadcast channel (PBCH: Physical Broadcast CHannel), downlink L1/L2 control channels and so on are used as downlink channels. User data, higher layer control information and SIBs (System Information Blocks) are communicated in the PDSCH. Also, MIBs (Master Information Blocks) are communicated in the PBCH.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI) including PDSCH and PUSCH scheduling information is communicated by the PDCCH. The number of OFDM symbols to use for the PDCCH is communicated by the PCFICH. HARQ delivery acknowledgement signals (ACKs/NACKs) in response to the PUSCH are communicated by the PHICH. The EPDCCH is frequency-division-multiplexed with the PDSCH (downlink shared data channel) and used to communicate DCI and so on, like the PDCCH.

In the radio communication system 1, an uplink shared channel (PUSCH: Physical Uplink Shared CHannel), which is used by each user terminal 20 on a shared basis, an uplink control channel (PUCCH: Physical Uplink Control CHannel), a random access channel (PRACH: Physical Random Access CHannel) and so on are used as uplink channels. User data and higher layer control information are communicated by the PUSCH. Also, downlink radio quality information (CQI: Channel Quality Indicator), delivery acknowledgment signals (HARQ-ACKs) and so on are communicated by the PUCCH. By means of the PRACH, random access preambles for establishing connections with cells are communicated.

<Radio Base Station>

Figure 14:
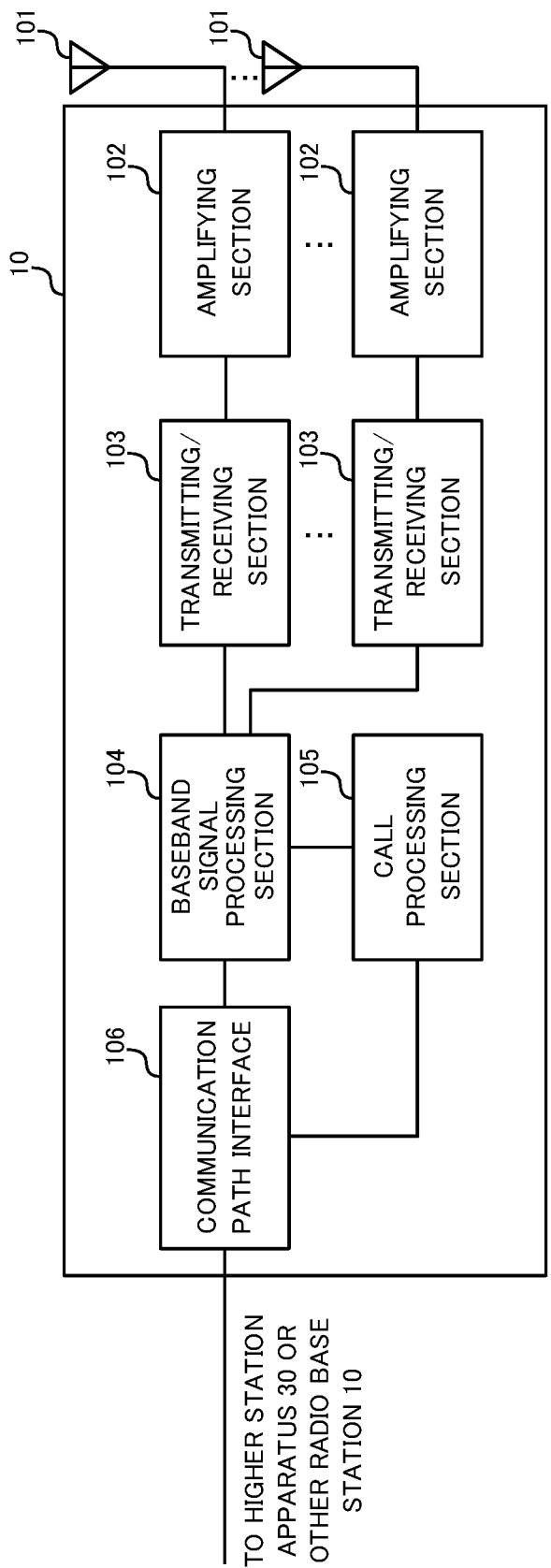
FIG. 14 is a diagram to show an example of an overall structure of a radio base station according to an embodiment of the present invention.

FIG. 14 is a diagram to show an example of an overall structure of a radio base station according to an embodiment of the present invention. A radio base station 10 has a plurality of transmitting/receiving antennas 10, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to the transmitting/receiving sections 103.

The transmitting/receiving sections 103 convert baseband signals that are pre-coded and output from the baseband signal processing section 104 on a per antenna basis, into a radio frequency band. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted by transmitters/receivers, transmitting/receiving circuits or transmitting/receiving devices that can be described based on common understanding of the technical field to which the present invention pertains. Note that a transmitting/receiving section 103 may be structured as a transmitting/receiving section in one entity, or may be constituted by transmitting section and receiving section.

Meanwhile, as for uplink signals, radio frequency signals that are received in the transmitting/receiving antennas 101 are each amplified in the amplifying sections 102. The transmitting/receiving sections 103 receive the uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing such as setting up and releasing communication channels, manages the state of the radio base station 10 and manages the radio resources.

The communication path interface section 106 transmits and receives signals to and from the higher station apparatus 30 via a predetermined interface. Also, the communication path interface 106 may transmit and receive signals (backhaul signaling) with other radio base stations 10 via an inter-base station interface (for example, an interface in compliance with the CPRI (Common Public Radio Interface), such as optical fiber, the X2 interface, etc.).

Note that the transmitting/receiving sections 103 transmit, to the user terminals 20, downlink signals that include information about the relationship between LCHs and LCGs, Information as to whether or not BSR tables for Rel. 13 CA are used, information as to whether or not more than four LCGs are used, information about the configurations of Rel. 13 CA (Rel. 13 CA configurations) and so on, which are generated in the transmission signal generating section 302 described below Also, the transmitting/receiving sections 103 receive uplink signals (for example, MAC signaling) that include BSRs (BSR MAC CEs) from the user terminals 20.

Figure 15:
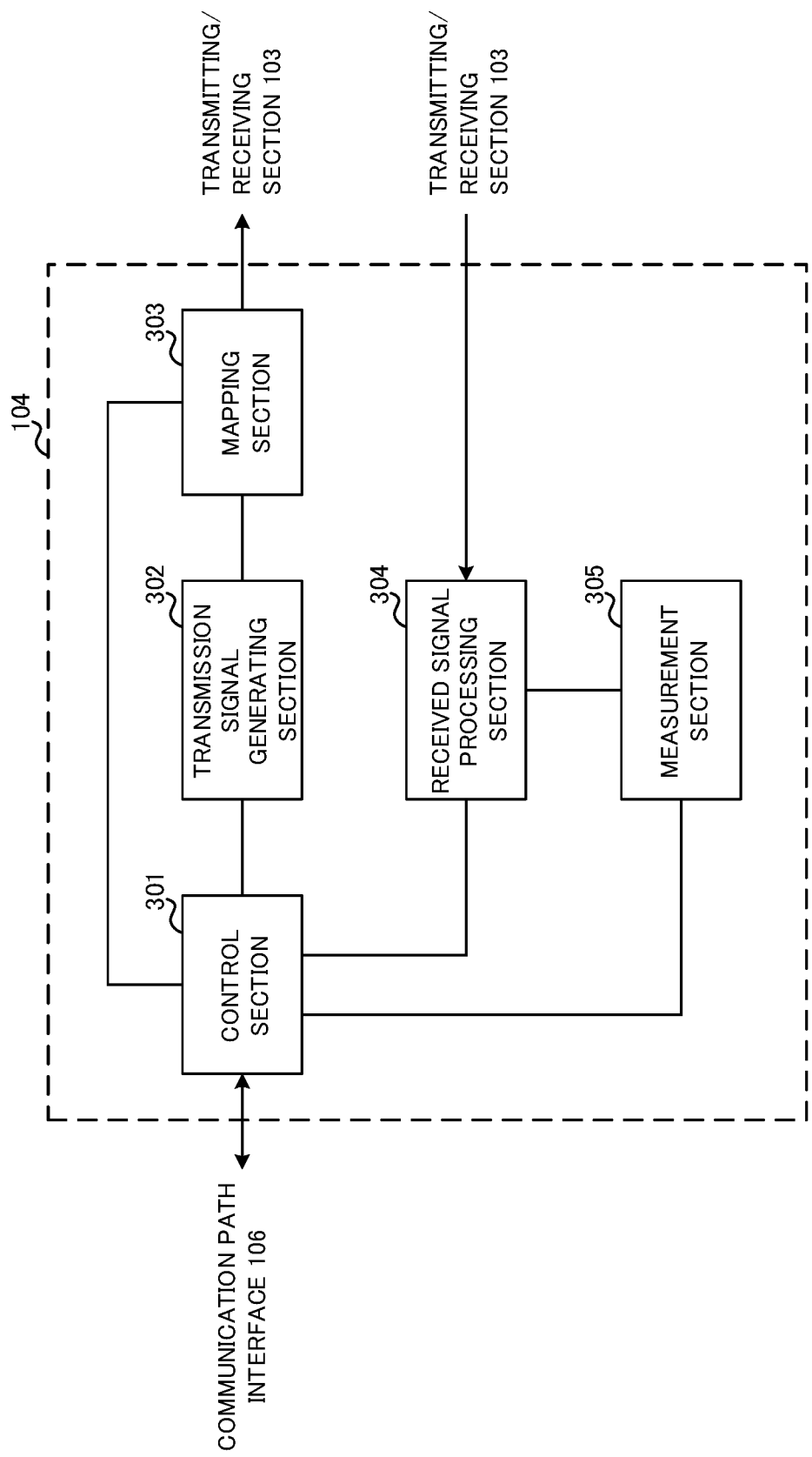
FIG. 15 is a diagram to show an example of a functional structure of a radio base station according to an embodiment of the present invention.

FIG. 15 is a diagram to show an example of a functional structure of a radio base station according to the present embodiment. Note that, although FIG. 15 primarily shows functional blocks that pertain to characteristic parts of the present embodiment, the radio base station 10 has other functional blocks that are necessary for radio communication as well. As shown in FIG. 15, the baseband signal processing section 104 provided in the radio base station 10 has a control section (scheduler) 301, a transmission signal generating section 302, a mapping section 303, a received signal processing section 304 and a measurement section 305.

The control section (scheduler) 301 controls the whole of the radio base station 10. The control section 301 can be constituted by a controller, a control circuit or a control device that can be described based on common understanding of the technical field to which the present invention pertains.

The control section 301, for example, controls the generation of signals in the transmission signal generating section 302, the allocation of signals by the mapping section 303, and so on. Furthermore, the control section 301 controls the signal receiving processes in the received signal processing section 304, the measurements of signals in the measurement section 305, and so on.

The control section 301 controls the scheduling (for example, resource allocation) of downlink data signals that are transmitted in the PDSCH and downlink control signals that are communicated in the PDCCH and/or the enhanced PDCCH (EPDCCH). Also, the control section 301 controls the scheduling of synchronization signals, and downlink reference signals such as the CRS (Cell-specific Reference Signal), the CSI-RS (Channel State Information Reference Signal), the DM-RS (Demodulation Reference Signal) and so on.

Also, the control section 301 controls the scheduling of uplink data signals transmitted in the PUSCH, uplink control signals transmitted in the PUCCH and/or the PUSCH (for example, delivery acknowledgement signals (HARQ-ACKs)), random access preambles transmitted in the PRACH, uplink reference signals and so on.

The control section 301 judges the buffer sizes of predetermined LCGs (or all LCGs) of a user terminal 20 based on BSRs input from the received signal processing section 304.

Here, the buffer sizes are judged by using the relationships between buffer sizes and indices (BSR table).

The control section 301 can use one or more BSR tables. For example, the control section 301 has a table to use to judge the buffer size of a predetermined user terminal 20 when more than five CCs are configured in this user terminal 20 (first embodiment). This table may be referred to as a "BSR table for Rel. 13 CA" (or "Rel. 13 table").

The Rel. 13 table may be structured to represent indices in six bits, which is the same as in existing systems, and represent buffer sizes up to $B_{max}$ for Rel. 13 (for example, 20 MB)(method 1 of the first embodiment). Also, the Rel. 13 table may be structured to represent indices in X bits (X>6), which is greater than in existing systems, and represent buffer sizes up to $B_{max}$ for Rel. 13 (method 2 of the first embodiment).

Furthermore, the Rel. 13 table may be structured to represent buffer sizes that are greater than $B_{max}$ of Rel. 10 (3 MB), up to $B_{max}$ for Rel. 13 (method 3 of the first embodiment). In this case, the control section 301 may be structured to be able to use another BSR table (for example, the table of Rel. 10) that can represent buffer sizes up to 3 MB. Also, the control section 301 can decide the table to use to judge buffer sizes, based on specifying information that is sent in MAC signaling, in which BSR MAC CEs are contained. This specifying information may be represented by using, for example, the bits that are provided as reserved (R: Reserved) fields in MAC PDU subheaders in LTE Rel. 10.

Also, the control section 301 can judge buffer sizes for more than four LCGs (second embodiment). The control section 301 can determine the buffer size of an LCG (for example, LCG ID #4 or above) that corresponds to a BSR MAC CE, based on the the LCG ID field of this BSR MAC CE, which is expanded to three or more bits, and/or the LCID fields in MAC PDU subheaders.

The control section 301 determines the table to use to specify the buffer size of the predetermined user terminal 20, and controls the transmission signal generating section 302 and the mapping section 303 to transmit information about the structure of the BSR table, information for specifying the table to use to generate BSRs (information as to whether or not to use the BSR table for Rel. 13 CA) and so on, to this user terminal 20.

Also, the control section 301 can control (schedule) the allocation of uplink radio resources based on the buffer size of the user terminal 20. For example, the control section 301 controls the generation and transmission of UL grants based on the buffer size.

The transmission signal generating section 302 generates downlink signals (downlink control signals, downlink data signals, downlink reference signals and so on) based on commands from the control section 301, and outputs these signals to the mapping section 303. The transmission signal generating section 302 can be constituted by a signal generator, a signal generating circuit or a signal generating device that can be described based on common understanding of the technical field to which the present invention pertains.

For example, the transmission signal generating section 302 generates DL assignments, which report downlink signal allocation information, and UL grants, which report uplink signal allocation information, based on commands from the control section 301. Also, the downlink data signals are subjected to the coding process, the modulation process and so on, by using coding rates and modulation schemes that are determined based on, for example, channel state information (CSI: Channel State Information) reported from each user terminal.

Also, as mentioned earlier, the transmission signal generating section 302 generates downlink signals that include information about the structure of the BSR table, information for specifying the table to use to generate BSRs (information as to whether or not to use the BSR table for Rel. 13 CA) and so on.

The mapping section 303 maps the downlink signals generated in the transmission signal generating section 302 to predetermined radio resources based on commands from the control section 301, and outputs these to the transmitting/receiving sections 103. The mapping section 303 can be constituted by a mapper, a mapping circuit or a mapping device that can be described based on common understanding of the technical field to which the present invention pertains.

The received signal processing section 304 performs receiving processes (for example, demapping, demodulation, decoding and so on) of received signals that are input from the transmitting/receiving sections 103. Here, the received signals include, for example, uplink signals transmitted from the user terminals 20 (uplink control signals, uplink data signals, uplink reference signals and so on). The received signal processing section 304 can be constituted by a signal processor, a signal processing circuit or a signal processing device that can be described based on common understanding of the technical field to which the present invention pertains.

The received signal processing section 304 outputs the decoded information acquired through the receiving processes to the control section 301. Also, the received signal processing section 304 outputs the received signals, the signals after the receiving processes and so on, to the measurement section 305.

The measurement section 305 conducts measurements with respect to the received signals. The measurement section 305 can be constituted by a measurer, a measurement circuit or a measurement device that can be described based on common understanding of the technical field to which the present invention pertains.

The measurement section 305 may measure the received power (for example, the RSRP (Reference Signal Received Power)), the received quality (for example, the RSRQ (Reference Signal Received Quality)), channel states and so on of the received signals. The measurement results may be output to the control section 301.

<User Terminal>

Figure 16:
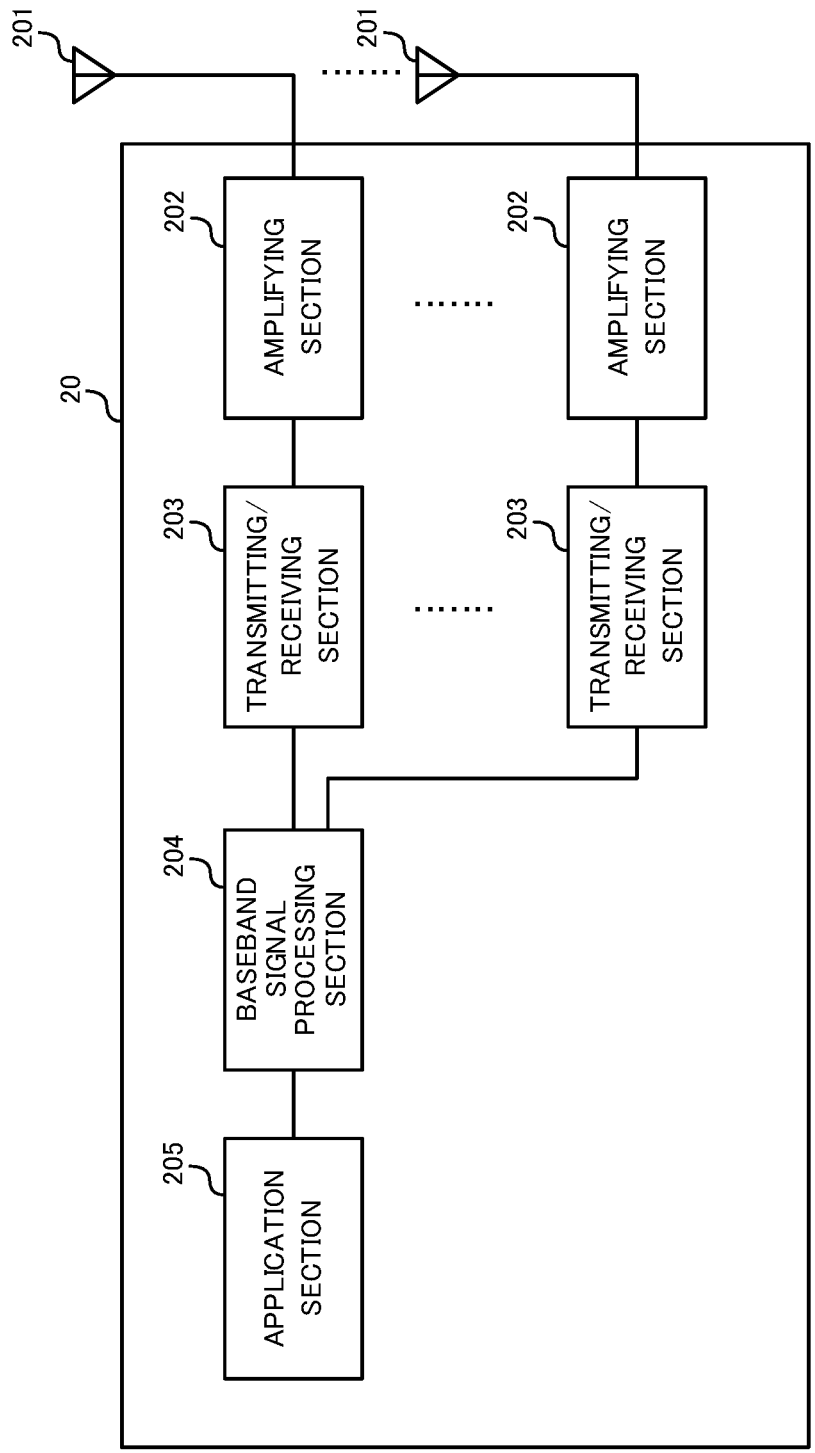
FIG. 16 is a diagram to show an example of an overall structure of a user terminal according to an embodiment of the present invention.

FIG. 16 is a diagram to show an example of an overall structure of a user terminal according to the present embodiment. A user terminal 20 has a plurality of transmitting/receiving antennas 201, amplifying sections 202, transmitting/receiving sections 203, a baseband signal processing section 204 and an application section 205. Note that one or more transmitting/receiving antennas 201, amplifying sections 202 and transmitting/receiving sections 203 may be provided.

Radio frequency signals that are received in a plurality of transmitting/receiving antennas 201 are each amplified in the amplifying sections 202. The transmitting/receiving sections 203 receive the downlink signals amplified in the amplifying sections 202. The received signals are subjected to frequency conversion and converted into the baseband signal in the transmitting/receiving sections 203, and output to the baseband signal processing section 204. The transmitting/receiving sections 203 can be constituted by transmitters/receivers, transmitting/receiving circuits or transmitting/receiving devices that can be described based on common understanding of the technical field to which the present invention pertains. Note that a transmitting/receiving section 203 may be structured as a transmitting/receiving section in one entity, or may be constituted by transmitting section and receiving section.

In the baseband signal processing section 204, the baseband signal that is input is subjected to an FFT process, error correction decoding, a retransmission control receiving process, and so on. Downlink user data is forwarded to the application section 205. The application section 205 performs processes related to higher layers above the physical layer and the MAC layer, and so on. Furthermore, in the downlink data, broadcast information is also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, pre-coding, a discrete Fourier transform (DFT) process, an IFFT process and so on, and the result is forwarded to the transmitting/receiving section 203. The baseband signal that is output from the baseband signal processing section 204 is converted into a radio frequency band in the transmitting/receiving sections 203. The radio frequency signals that are subjected to frequency conversion in the transmitting/receiving sections 203 are amplified in the amplifying sections 202, and transmitted from the transmitting/receiving antennas 201.

Note that, transmitting/receiving sections 203 receive, from the radio base station 10, downlink signals that include information about the relationship between LCHs and LCGs, information as to whether or not BSR tables for Rel. 13 CA are used, information as to whether or not more than four LCGs are used, information about the configurations of Rel. 13 CA (Rel. 13 CA configurations) and so on. Also, the transmitting/receiving sections 203 receive UL grants that include resource allocation information.

Also, the transmitting/receiving sections 203 transmit uplink signals (for example, MAC signaling) that contain BSRs (BSR MAC CEs) to the radio base station 10.

Figure 17:
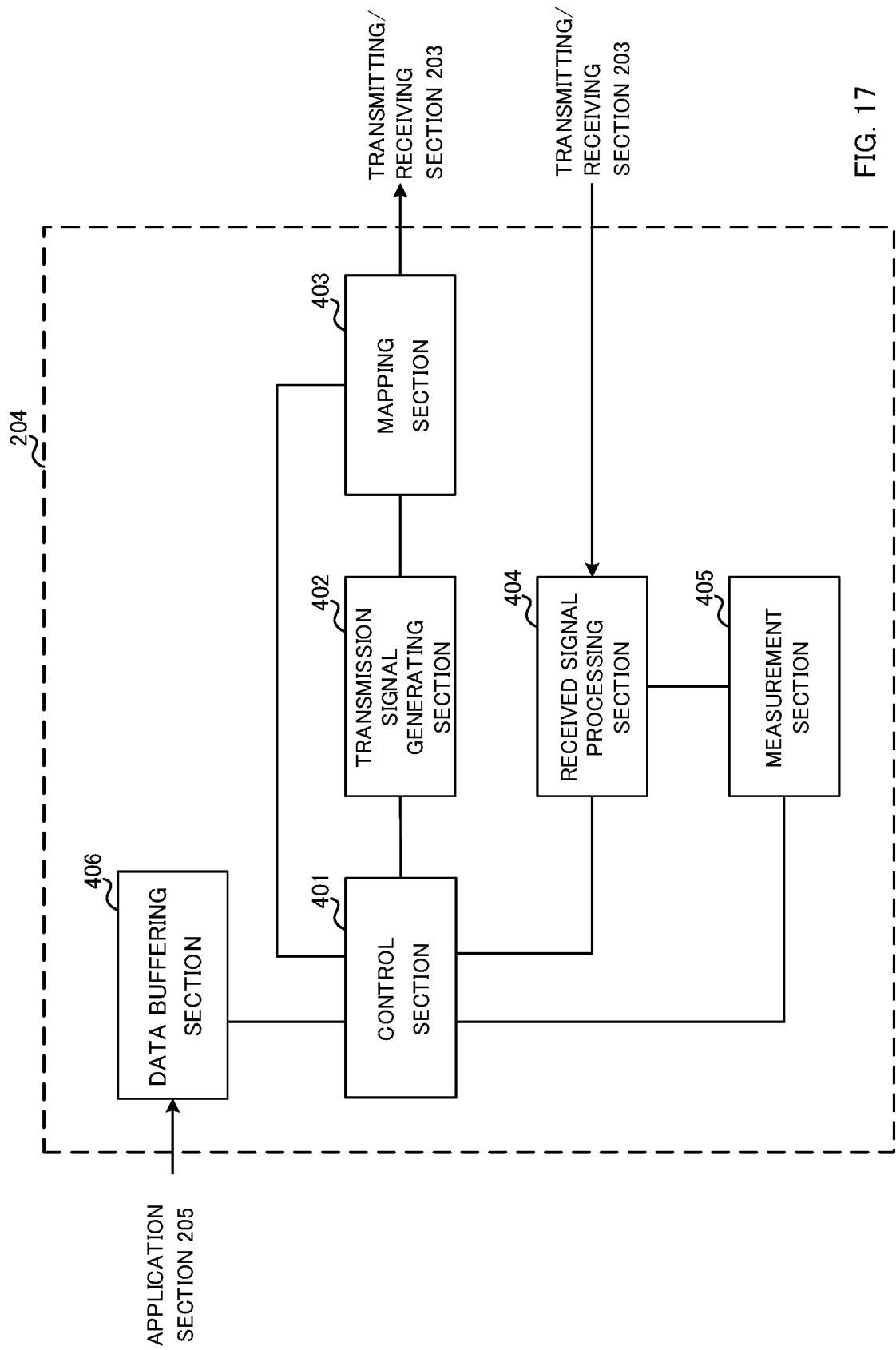
FIG. 17 is a diagram to show an example of a functional structure of a user terminal according to an embodiment of the present invention.

FIG. 17 is a diagram to show an example of a functional structure of a user terminal according to the present embodiment. Note that, although FIG. 17 primarily shows functional blocks that pertain to characteristic parts of the present embodiment, the user terminal 20 has other functional blocks that are necessary for radio communication as well. As shown in FIG. 17, the baseband signal processing section 204 provided in the user terminal 20 has a control section 401, a transmission signal generating section 402, a mapping section 403, a received signal processing section 404, a measurement section 405 and data buffering section 406.

The control section 401 controls the whole of the user terminal 20. The control section 401 can be constituted by a controller, a control circuit or a control device that can be described based on common understanding of the technical field to which the present invention pertains.

The control section 401, for example, controls the generation of signals in the transmission signal generating section 402, the allocation of signals by the mapping section 403, and so on. Furthermore, the control section 401 controls the signal receiving processes in the received signal processing section 404, the measurements of signals in the measurement section 405, and so on.

The control section 401 acquires the downlink control signals (signals transmitted in the PDCCH/EPDCCH) and downlink data signals (signals transmitted in the PDSCH) transmitted from the radio base station 10, from the received signal processing section 404. The control section 401 controls the generation of uplink control signals (for example, delivery acknowledgement signals (HARQ-ACKs) and so on) and uplink data signals based on the downlink control signals, the results of deciding whether or not retransmission control is necessary for the downlink data signals, and so on.

The control section 401 executes control for reporting the volume of data (buffer size) that is accumulated in the data buffering section 406, per LCG, to the radio base station 10. First, the control section 401 acquires each LCG's buffer size from the data buffering section 406. Then, the control section 401 controls the transmission signal generating section 402 and the mapping section 403 to generate and transmit BSRs, which contain predetermined indices that correspond to the buffer sizes.

Here, the buffer sizes are judged by using the relationships between buffer sizes and indices (BSR table). The control section 401 can use one or more BSR tables. For example, the control section 401 has a table (Rel. 13 table) to use to judge the buffer size of a user terminal 20 when more than five CCs are configured in this user terminal 20 (first embodiment).

Note that the control section 401 can judge whether or not more than five CCs are configured based on the information about the relationship between LCHs and LCGs, the information as to whether or not BSR tables for Rel. 13 CA are used, the information as to whether or not more than four LCGs are used, the information about the configurations of Rel. 13 CA (Rel. 13 CA configurations), the information about the number of CCs and so on, which are input from the received signal processing section 404.

The control section 401 determines the BSR table to use to generate BSRs based on reports from the radio base station 10 (for example, RRC signaling) and/or each LCG's buffer size (first embodiment). Here, the control section 401 may use the Rel. 13 table to generate BSRs that pertain to buffer sizes greater than $B_{max}$ of Rel. 10 (3 MB), up to $B_{max}$ for Rel. 13 (method 3 of the first embodiment). In this case, the control section 401 may be structured to be able to use another BSR table (for example, the table of Rel. 10) that can represent buffer sizes up to 3 MB. Also, the control section 401 can control MAC signaling to contain specifying information for specifying the table to use to judge the buffer size.

Also, the control section 401 may control BSRs that correspond to buffer sizes pertaining to more than four LCGs (second embodiment). The control section 401 can structure MAC signaling so that an LCG (for example, LCG ID #4 or above) that corresponds to a BSR MAC CE can be specified based on the LCG ID field of this BSR MAC CE, which is expanded to three or more bits, and/or the LCID fields in MAC PDU subheaders.

Also, the control section 401 can manage a timer that provides a timing reference when the user terminal 20 transmits BSRs. For example, the control section 401 may manage a periodicBSR-timer, a retxBSR-timer and so on, and performs the processes to start, restart and stop these timers.

Also, if information about uplink resource allocation (for example, resource allocation information included in UL grants) is acquired from the received signal processing section 404, the control section 401 executes control so that uplink data is transmitted by using the resources that are allocated. To be more specific, the control section 401 controls the data buffering section 406 to output a predetermined amount of data to the transmission signal generating section 402, controls the transmission signal generating section 402 to generate input data in the form of an uplink data signal (PUSCH signal) and output this to the mapping section 403, and controls the mapping section 403 to map the input uplink data signal to an uplink resource and output this.

The transmission signal generating section 402 generates uplink signals (uplink control signals, uplink data signals, uplink reference signals and so on) based on commands from the control section 401, and outputs these signals to the mapping section 403. The transmission signal generating section 402 can be constituted by a signal generator, a signal generating circuit or a signal generating device that can be described based on common understanding of the technical field to which the present invention pertains.

For example, the transmission signal generating section 402 generates uplink control signals such as delivery acknowledgement signals (HARQ-ACKs), channel state information (CSI) and so on, based on commands from the control section 401. Also, the transmission signal generating section 402 generates uplink data signals based on commands from the control section 401. For example, when a UL grant is included in a downlink control signal that is reported from the radio base station 10, the control section 401 commands the transmission signal generating section 402 to generate an uplink data signal.

Also, the transmission signal generating section 402 generates uplink data signals by using data that is input from the data buffering section 406, based on commands from the control section 401. Also, based on commands from the control section 401, the transmission signal generating section 402 generates BSR MAC CEs and form the MAC PDU, which are then included in transmission signals and output to the mapping section 403.

To be more specific, the transmission signal generating section 402 may form the BS field in BSR MAC CEs by using six bits (method 1 of the first embodiment), or by using X bits (X>6), which is greater than in existing systems (method 2 of the first embodiment). In this case, the transmission signal generating section 402 includes information (LCIDs) for specifying the type of BSR MAC CEs (short BSR/truncated BSR, long BSR, etc.) in MAC PDU subheaders.

Also, the transmission signal generating section 402 may include specifying information for specifying the BSR table (or the type of the BSR table) used to generate BSRs, in MAC PDU subheaders (method 3 of the first embodiment). This specifying information may be represented by using, for example, the bits that are provided as reserved (R: Reserved) fields in MAC PDU subheaders in LTE Rel. 10.

Also, the transmission signal generating section 402 may include an LCID field that indicates LCG ID #4 or above in MAC PDU subheaders, or form the LCG ID field in BSR MAC CEs with three bits or more (second embodiment)

The mapping section 403 maps the uplink signals generated in the transmission signal generating section 402 to radio resources based on commands from the control section 401, and output the result to the transmitting/receiving sections 203. The mapping section 403 can be constituted by a mapper, a mapping circuit or a mapping device that can be described based on common understanding of the technical field to which the present invention pertains.

The received signal processing section 404 performs receiving processes (for example, demapping, demodulation, decoding and so on) of received signals that are input from the transmitting/receiving sections 203. Here, the received signals include, for example, downlink signals (downlink control signals, downlink data signals, downlink reference signals and so on) that are transmitted from the radio base station 10. The received signal processing section 404 can be constituted by a signal processor, a signal processing circuit or a signal processing device that can be described based on common understanding of the technical field to which the present invention pertains. Also, the received signal processing section 404 can constitute the receiving section according to the present invention.

The received signal processing section 404 output the decoded information that is acquired through the receiving processes to the control section 401. The received signal processing section 404 outputs, for example, broadcast information, system information, RRC signaling, DCI and so on, to the control section 401. Also, the received signal processing section 404 outputs the received signals, the signals after the receiving processes and so on to the measurement section 405.

The measurement section 405 conducts measurements with respect to the received signals. The measurement section 405 can be constituted by a measurer, a measurement circuit or a measurement device that can be described based on common understanding of the technical field to which the present invention pertains.

The measurement section 405 may measure, for example, the received power (for example, RSRP), the received quality (for example, RSRQ), the channel states and so on of the received signals. The measurement results may be output to the control section 401.

The data buffering section 406 accumulates (buffering) the user data (uplink data) that is input from the application section 205. Based on commands from the control section 401, the data buffering section 406 outputs a given amount of data, from the accumulated data, to the transmission signal generating section 402. The data buffering section 406 can be constituted by a buffer, a buffer circuit or a buffer device that can be described based on common understanding of the technical field to which the present invention pertains.

Note that the block diagrams that have been used to describe the above embodiments show blocks in functional units. These functional blocks (components) may be implemented in arbitrary combinations of hardware and software. Also, the means for implementing each functional block is not particularly limited. That is, each functional block may be implemented with one physically-integrated device, or may be implemented by connecting two physically-separate devices via radio or wire and using these multiple devices.

For example, part or all of the functions of radio base stations 10 and user terminals 20 may be implemented using hardware such as ASICs (Application-Specific Integrated Circuits), PLDs (Programmable Logic Devices), FPGAs (Field Programmable Gate Arrays), and so on. Also, the radio base stations 10 and user terminals 20 may be implemented with a computer device that includes a processor (CPU), a communication interface for connecting with networks, a memory and a computer-readable storage medium that holds programs. That is, radio base stations and user terminals according to one embodiment of the present invention may function as computers that execute the processes of the radio communication method of the present invention.

Here, the processor and the memory are connected with a bus for communicating information. Also, the computer-readable recording medium is a storage medium such as, for example, a flexible disk, an opto-magnetic disk, a ROM, an EPROM, a CD-ROM, a RAM, a hard disk and so on. Also, the programs may be transmitted from the network through, for example, electric communication channels. Also, the radio base stations 10 and user terminals 20 may include input devices such as input keys and output devices such as displays.

The functional structures of the radio base stations 10 and user terminals 20 may be implemented with the above-described hardware, may be implemented with software modules that are executed on the processor, or may be implemented with combinations of both. The processor controls the whole of the user terminals by running an operating system. Also, the processor reads programs, software modules and data from the storage medium into the memory, and executes various types of processes.

Here, these programs have only to be programs that make a computer execute each operation that has been described with the above embodiments. For example, the control section 401 of the user terminals 20 may be stored in the memory and implemented by a control program that operates on the processor, and other functional blocks may be implemented likewise.

Also, software and commands may be transmitted and received via communication media. For example, when software is transmitted from a website, a server or other remote sources by using wired technologies such as coaxial cables, optical fiber cables, twisted-pair cables and digital subscriber lines (DSL) and/or wireless technologies such as infrared radiation, radio and microwaves, these wired technologies and/or wireless technologies are also included in the definition of communication media.

Note that the terminology used in this description and the terminology that is needed to understand this description may be replaced by other terms that convey the same or similar meanings. For example, radio resources may be indicated in indices. Also, "channels" and/or "symbols" may be replaced by "signals" (or "signaling"). "Signals" may be "messages." Furthermore, "component carriers" (CCs) may be referred to as "carrier frequencies," "cells" and so on.

The examples/embodiments illustrated in this description may be used individually or in combinations, and the mode of may be switched depending on the implementation. Also, a report of predetermined information (for example, a report to the effect that "X holds") does not necessarily have to be sent explicitly, and can be sent implicitly (by, for example, not reporting this piece of information).

Reporting of information is by no means limited to the examples/embodiments described in this description, and other methods may be used as well. For example, reporting of information may be implemented by using physical layer signaling (for example, DCI (Downlink Control Information) and UCI (Uplink Control Information)), higher layer signaling (for example, RRC (Radio Resource Control) signaling, MAC (Medium Access Control) signaling, and broadcast information (MIBs (Master Information Blocks) and SIBs (System Information Blocks))), other signals or combinations of these. Also, RRC signaling may include, for example, an RRC connection setup message, RRC connection reconfiguration message, and so on.

The information, signals and/or others described in this description may be represented by using a variety of different technologies. For example, data, instructions, commands, information, signals, bits, symbols and chips, all of which may be referenced throughout the description, may be represented by voltages, currents, electromagnetic waves, magnetic fields or particles, optical fields or photons, or any combination of these.

The examples/embodiments illustrated in this description may be applied to LTE (Long Term Evolution), LTE-A (LTE-Advanced), SUPER 3G, IMT-Advanced, 4G, 5G, FRA (Future Radio Access), CDMA 2000, UMB (Ultra Mobile Broadband), IEEE 802.11 (Wi-Fi), IEEE 802.16 (WiMAX), IEEE 802.20, UWB (Ultra-WideBand), Bluetooth (registered trademark), and other adequate systems, and/or next-generation systems that are enhanced based on these.

The order of processes, sequences, flowcharts and so on that have been used to describe the examples/embodiments herein may be re-ordered as long as inconsistencies do not arise. For example, although various methods have been illustrated in this description with various components of steps in exemplary orders, the specific orders that illustrated herein are by no means limiting.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The disclosure of Japanese Patent Application No. 2015-099491, filed on May 14, 2015, including the specification, drawings and abstract, is incorporated herein by reference in its entirety.

The invention claimed is:

1. A user terminal comprising:
a processor that generates a Buffer Status Report Medium Access Control Control Element (BSR MAC CE) including an index that corresponds to a buffer size of a Logical Channel Group (LCG) defined for such LCGs that a maximum number of LCGs is greater than 4, based on associations between buffer sizes and indices, the buffer size being an uplink data amount; and
a transmitter that transmits the BSR MAC CE,
wherein a number of LCGs used by the user terminal is greater than 4 without regard to the number of cells with which the user terminal is configured, and
at least one of the associations is used when the user terminal is configured with more than five cells.

2. The user terminal according to claim 1, wherein the processor includes, in a MAC Protocol Data Unit (PDU) including the BSR MAC CE, a Logical Channel Identifier (LCID) that is not used in LTE Rel. 12.

3. A radio communication method for a user terminal, comprising:
generating a Buffer Status Report Medium Access Control Control Element (BSR MAC CE) including an index that corresponds to a buffer size of a Logical Channel Group (LCG) defined for such LCGs that a maximum number of LCGs is greater than 4, based on associations between buffer sizes and indices, the buffer size being an uplink data amount; and
transmitting the BSR MAC CE,
wherein a number of LCGs used by the user terminal is greater than 4 without regard to the number of cells with which the user terminal is configured, and at least one of the associations is used when the user terminal is configured with more than five cells.

* * * * *